Figure 5:
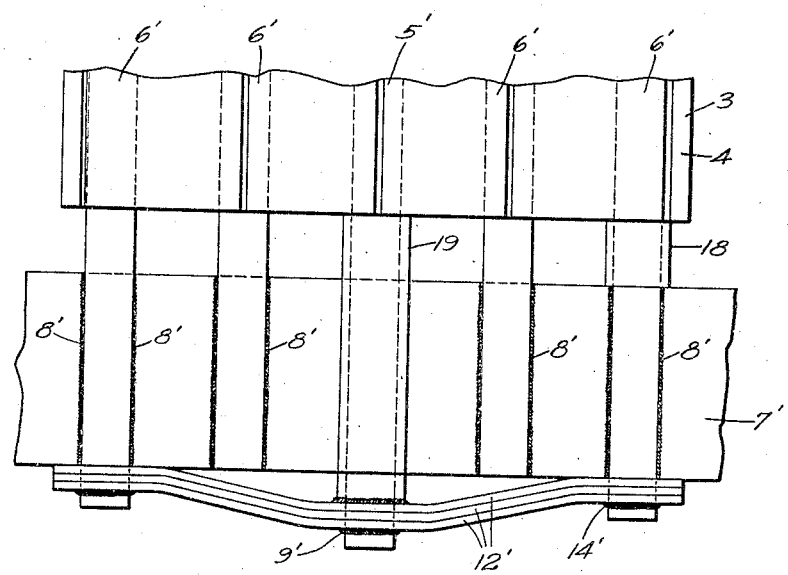

Oct. 28, 1941.  C. C. SHUTT ET AL.  2,261,039
SQUIRREL-CAGE WINDING
Filed June 1, 1939  2 Sheets-Sheet 1
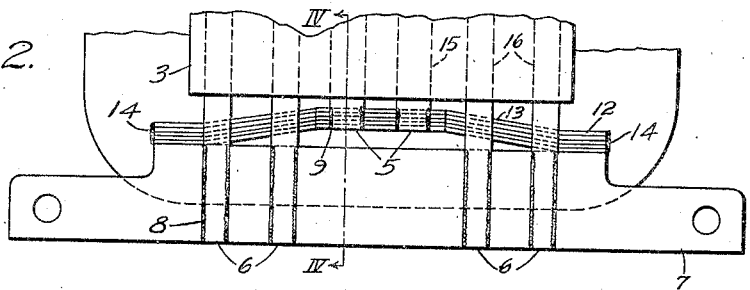
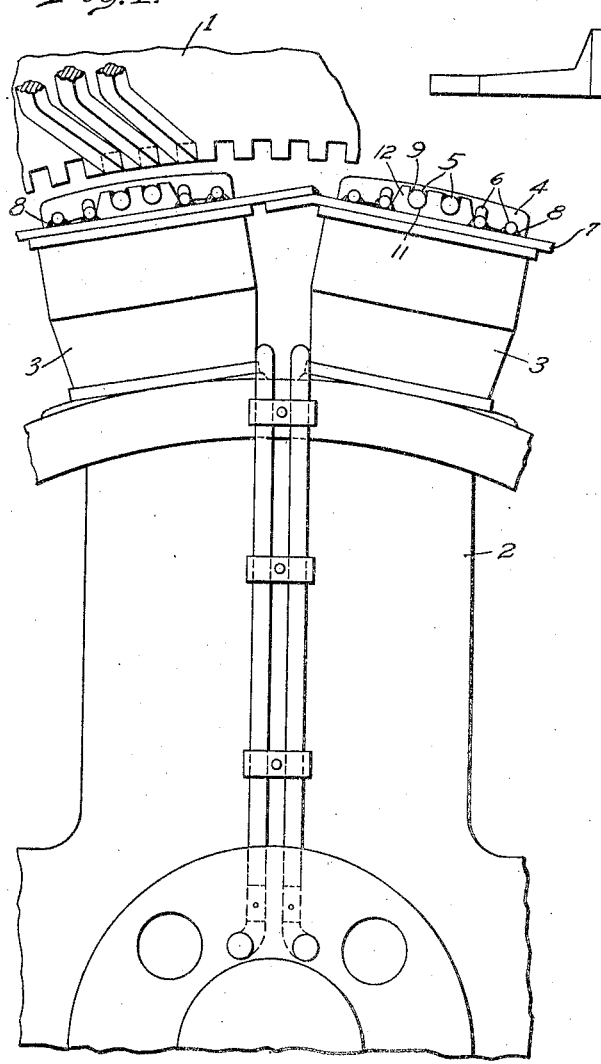
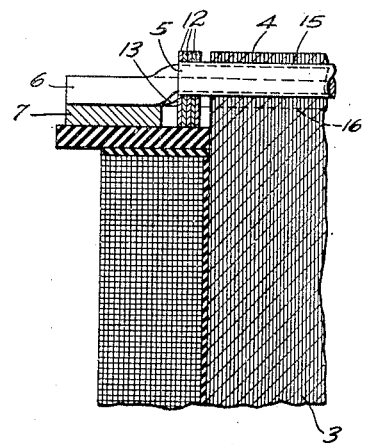
WITNESSES:
INVENTORS
Charles C. Shutt and
Marion R. Lory.
BY
ATTORNEY Patented Oct. 28, 1941

2,261,039

UNITED STATES PATENT OFFICE 2,261,039

SQUIRREL-CAGE WINDING

Charles C. Shutt, Lima, Ohio, and Marion R. Lory, Irwin, Pa., assignors to Westinghouse Electric & Manufacturing Company, East Pittsburgh, Pa., a corporation of Pennsylvania Application June 1, 1939, Serial No. 276,756

6 Claims. (Cl. 172—120)

Our invention relates to self-starting, alternating-current, dynamo-electric machines of a type having a squirrel-cage secondary winding in which some of the squirrel-cage bars are of low resistance and high reactance, while others are of high resistance and low reactance, both types of bars being connected, at each end, to a common end-ring at that end. More particularly, our invention relates to large polyphase synchronous dynamo-electric machines having salient-pole rotors, and having damper-winding bars, of the type just described, in the pole-face portions of the salient poles.

It has, for a long time, been well known that squirrel-cage or damper-bar windings, for efficient duty both during starting and at high speed, should be constructed with two sets of bars, one set being of low resistance and high reactance, and the second set being of high resistance and low reactance, the latter set carrying most of the current at starting, because of the high slip-frequency in the squirrel-cage bars, and the first set carrying most of the current during full-speed running conditions because of the very small, or practically non-existent, slip-frequency.

In order to obtain bars of different reactances, two expedients are known, and both have been utilized in the prior art. One expedient is to place the high-reactance bars deep down in deep slots, while placing the low-reactance bars closer to the periphery of the secondary member, forming what is known as a double-deck squirrel-cage winding. Such windings usually have separate sets of end-rings for the upper-deck and lower-deck bars, respectively, thus requiring more axial room at the end of the winding, while also requiring more radial room for the deep bars, the latter feature being particularly objectionable in the case of damper-windings which are placed in the pole-face portions of a salient-pole synchronous machine, because the deep slots necessitate radially deep pole-face portions, and hence an increase in the diameter of the rotor.

The other expedient for obtaining the difference in reactance in the two sets of damper-winding bars has been to concentrate the high-reactance bars, for each pole, in one or two, or other small number of bars, bunched together in the middle of the pole-face, while the low-reactance bars are spread out, in a larger number of bars, distributed circumferentially over the remainder of the periphery so as to obtain a low-reactance effect. Such damper-winding constructions have been utilized for a number of years in large synchronous machines. They have a serious disadvantage, however, particularly in machines which are required to start under heavily loaded conditions, so that the starting period is greatly prolonged, in which case the high-resistance damper-bars become very much overheated, so that one set of the damper bars becomes very much hotter than the other set, during the prolonged starting-period, resulting in high stresses due to unequal thermal expansions. These stresses, repeated on each start, sometimes lead to failure of certain of the bars. The cure by utilizing two end-rings at each end of the machine is not always feasible, and is open to various objections, not the least of which is the additional space required therefor.

According to our present invention, the foregoing difficulties have been overcome by the utilization of a single end-ring at each end of the squirrel-cage construction, in combination with flexible connections between one set of squirrel-cage bars and the end-rings, and solid connections between the other set of squirrel-cage bars and the end rings.

Our invention is illustrated in two forms of embodiment, in the accompanying drawings, wherein:

Figure 1 is a partial end-view of a polyphase synchronous dynamo-electric machine embodying our invention in one form of embodiment.

Figure 6:
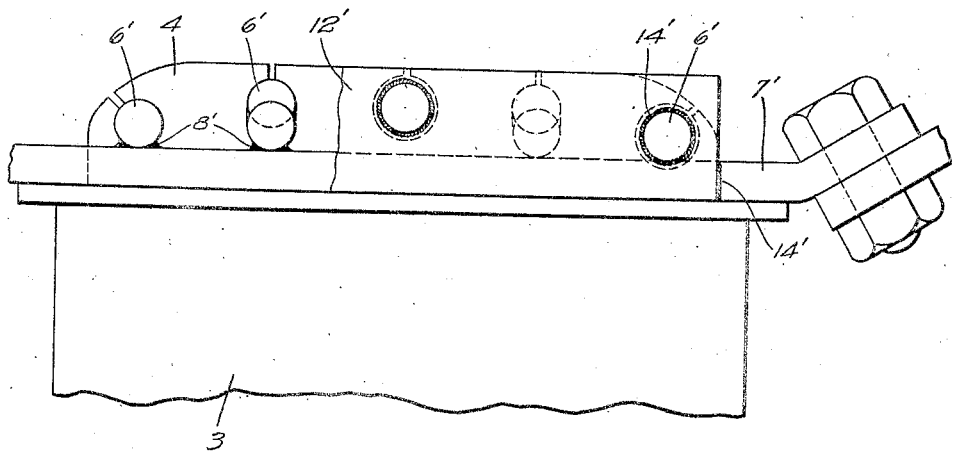

Fig. 2 is a top plan view of one end of one of the pole-face portions in Fig. 1, Fig. 3 is a detail of one of our flexible strap-connectors, as utilized in Figs. 1 and 2, Fig. 4 is a sectional view on the line IV—IV of Fig. 2, Fig. 5 is a view similar to Fig. 2, showing a modified form of embodiment of our invention, and Fig. 6 is an end view of the construction shown in Fig. 5, with parts broken away to illustrate the construction.

In Figs. 1 to 4, our invention is illustrated as being applied to a large polyphase synchronous-machine having a primary-winding stator member 1 and a field-winding rotor member 2, the latter having eighteen salient poles 3. Disposed in the pole-face portions 4 of the salient poles 3 are two sets of damper-winding bars 5 and 6. The damper-bars 5 are disposed in the center of each pole-face 4 and are only a few in number, there being two in Figs. 1 to 4, and one in Figs. 5 and 6. The damper-bars 6, in each pole-face 4, are more in number, and are spread out circumferentially over the remainder of the pole-face area, half of the bars 6 being disposed on the one side, and half of the bars 6 being disposed on the other side, of the centrally disposed bars 5. The two sets of damper-bars 5 and 6 of all of the poles 3 are connected, at each end, to a common damper-ring 7, which may be either a single integral ring, or may be fabricated, as shown, from segmental pieces which are suitably secured together.

In accordance with our present invention, the means for securing the damper-bars 5 to the common end-ring 7 are different from the means for securing the damper-bars 6 to the common end-ring 7, the difference being that one of the said connecting-means is flexible, whereas the other one is not. In the illustrated form of embodiment, the damper-bars 6 are brazed to the end rings 7, as indicated at 8, forming a solid, unyielding connection. The damper-bars 5 are cut off shorter than the damper-bars 6 and are brazed, at 9, to centrally disposed slots 11 in a plurality of flexible connecting straps 12, which are bent, as indicated at 13, so that the ends of the straps 12 are in contact with the lateral face of the end-ring 7, and are brazed thereto, as indicated at 14. The flexible straps 12 are disposed at approximately right angles to the bars 5 so that they are substantially non-yielding in a direction crosswise of the bars, while being flexible in a direction lengthwise of the bars, thus permitting unequal longitudinal thermal expansions of the two sets of bars 5 and 6.

In operation, it will be understood that the centrally disposed bars 5, being few in number, will have more reactance than the distributed bars 6. The bars 5 are made of copper, and are usually of somewhat larger cross-section than the bars 6, so that the bars 5 have a low resistance. The bars 6 are made of a high-resistance conducting material, and usually have the smaller cross-section, so that the resistivity of each of the bars 6 is commonly as much as twenty times that of one of the bars 5. The effect of this construction can be shown, by calculation and test, to be equivalent to an effective double deck damper winding. In particular, the low-resistance bars 5 increase the pull-in torque of the machine, during the low-slip portion of the starting-period.

The bars 5 and 6 are radially fixed, in the respective pole pieces 3, by being secured in pole-face slots 15 and 16, respectively, so that the only movement of the bars is a longitudinal or endwise movement due to thermal expansions.

In Figs. 5 and 6 we show a slightly different embodiment of our invention, in a slower, 44-pole synchronous motor. In this case, there is only one central bar 5' in each of the pole-faces 4, said central bar being, in this case, longer than the distributed bars 6', so that the end of the central bar 5' extends out beyond the end-ring 7'. The projecting end of the central bar 5' is centrally brazed, as indicated at 9' to a plurality of flexible straps 12', the ends of which are brazed, as indicated at 14' to one of the distributed bars 6', which is slightly elongated for this purpose, and also to the side of the end-ring 7'. As in the previously described embodiment of our invention, the damper-bars 6' are brazed directly to the end-ring 7', as indicated at 8'. The end-ring 7' may be spaced from the end of the pole-face portion 4, by means of spacers 18, one spacer for each pole-piece being enough, while the flexible strap-conductors 12 are spaced from the end of each of the respective pole-face portions 4 by means of spacers 19.

The operation of the form of construction shown in Figs. 5 and 6 will be apparent from the explanation in connection with Figs. 1 to 4, the central bars 5' being of good conducting material, as before, and having a relatively high reactance, because there is only one of such central bars 5' per pole, whereas the distributed bars 6' are of high-resistance material and are of low reactance because there are a number of such bars in parallel, for each pole-piece 3. As before, the flexible straps 12' effectually take up the differences in the longitudinal lengths of the bars 5' and 6', respectively, as a result of unequal thermal expansions of the bars during prolonged starting-periods.

While we have illustrated our invention in two preferred forms, we wish it to be distinctly understood that we have intended merely to illustrate our invention, without necessarily limiting it, in its broadest applications, to these particular forms. We desire, therefore, that the appended claims shall be accorded the broadest construction consistent with their language and the prior art.

We claim as our invention:

1. A dynamo-electric machine having a salient-pole rotor, radially fixed damper-winding bars in the pole-face portions of the salient poles, the damper-winding bars of each pole comprising two types including a bar or group of bars, consisting of a relatively small number of centrally located low-resistance bars or bar, and a group of a relatively large number of spaced high-resistance bars disposed partly on one side and partly on the other side of the low-resistance bar or bars, the bars being of different lengths, a common end-ring, at each end of the bars, for joining together all of the bars of all of the poles at that end of the machine, and connecting-means for joining the bar-ends to the respective end-rings, said connecting-means including substantially non-yielding connections for the respective bars or groups of bars of one of said types, and flexible connections for the respective bars or groups of bars of the other of said types, said flexible connections being circumferentially extending strips substantially non-yieldingly secured to the bars and to the end-rings at approximately alined points which are circumferentially spaced from each other by a distance sufficient to give the strips flexibility between said points.

2. A dynamo-electric machine having a salient-pole rotor, radially fixed damper-winding bars in the pole-faced portions of the salient poles, the damper-winding bars of each pole comprising a relatively small number of centrally located low-resistance bars or bar, and a relatively large number of spaced high-resistance bars disposed partly on one side and partly on the other side of the low-resistance bar or bars, the bars being of different lengths, a common end-ring, at each end of the bars, for joining together all of the bars of all of the poles at that end of the machine, and connecting-means for joining the bar-ends to the respective end-rings, said connecting-means including substantially non-yielding connections for said high-resistance bars, and flexible connections for the respective low-resistance bars or groups of bars, said flexible connections being circumferentially extending strips substantially non-yieldingly secured to the bars and to the end-rings at approximately alined points which are circumferentially spaced from each other by a distance sufficient to give the strips flexibility between said points.

3. A dynamo-electric machine having a salient-pole rotor, radially fixed damper-winding bars in the pole-face portions of the salient poles, some of said bars being of the low-resistance, high-reactance type and others of said bars being of the high-resistance, low-reactance type, the bars being of different lengths, a common end-ring, at each end of the bars, for joining together all of the bars of all of the poles at that end of the machine, and connecting-means for joining the bar-ends to the respective end-rings, said connecting means including substantially non-yielding connections for the bars of one of said types, and flexible connections for the bars of the other of said types, said flexible connections being circumferentially extending strips substantially non-yieldingly secured to the bars and to the end-rings at approximately alined points which are circumferentially spaced from each other by a distance sufficient to give the strips flexibility between said points.

4. A dynamo-electric machine having a salient-pole rotor, radially fixed damper-winding bars in the pole-face portions of the salient poles, some of said bars being of the low-resistance, high-reactance type and others of said bars being of the high-resistance, low-reactance type, the bars being of different lengths, a common end-ring, at each end of the bars, for joining together all of the bars of all of the poles at that end of the machine, and connecting-means for joining the bar-ends to the respective end-rings, said connecting-means including substantially non-yielding connections for the high-resistance, low-reactance bars, and flexible connections for the low-resistance, high-reactance bars, said flexible connections being circumferentially extending strips substantially non-yieldingly secured to the bars and to the end-rings at approximately alined points which are circumferentially spaced from each other by a distance sufficient to give the strips flexibility between said points.

5. A self-starting, alternating-current, dynamo-electric machine of a type having a squirrel-cage secondary winding characterized by some squirrel-cage bars of the low-resistance, high-reactance type and other squirrel-cage bars of the high-resistance, low-reactance type, the bars being of different lengths, a common end-ring, at each end of the bars, for joining together all of the bars at that end of the machine, and connecting-means for joining the bar-ends to the respective end-rings, said connecting-means including substantially non-yielding connections for the bars of one of said types, and flexible connections for the bars of the other of said types, said flexible connections being circumferentially extending strips substantially non-yieldingly secured to the bars and to the end-rings at approximately alined points which are circumferentially spaced from each other by a distance sufficient to give the strips flexibility between said points.

6. A self-starting, alternating-current, dynamo-electric machine of a type having a squirrel-cage secondary winding characterized by some squirrel-cage bars of the low-resistance, high-reactance type and other squirrel-cage bars of the high-resistance, low-reactance type, the bars being of different lengths, a common end-ring, at each end of the bars, for joining together all of the bars at that end of the machine, and connecting-means for joining the bar-ends to the respective end-rings, said connecting means including substantially non-yielding connections for the high-resistance, low-reactance bars, and flexible connections for the low-resistance, high-reactance bars, said flexible connections being circumferentially extending strips substantially non-yieldingly secured to the bars and to the end-rings at approximately alined points which are circumferentially spaced from each other by a distance sufficient to give the strips flexibility between said points.

CHARLES C. SHUTT.
MARION R. LORY.